US008046393B2

(12) United States Patent
Lang

(10) Patent No.: US 8,046,393 B2
(45) Date of Patent: Oct. 25, 2011

(54) APPARATUS AND METHOD OF DATA ORGANISATION

(76) Inventor: Mikael Carl Lang, Surbiton (GB)

( * ) Notice: Subject to any disclaimer, the term of this patent is extended or adjusted under 35 U.S.C. 154(b) by 941 days.

(21) Appl. No.: 11/781,458

(22) Filed: Jul. 23, 2007
(Under 37 CFR 1.47)

(65) Prior Publication Data
US 2008/0177763 A1    Jul. 24, 2008

(30) Foreign Application Priority Data

Aug. 3, 2006 (GB) .................................. 0615440.5

(51) Int. Cl.
*G06F 17/00*    (2006.01)
(52) U.S. Cl. ........ 707/960; 707/957; 707/955; 707/825; 707/795; 707/802
(58) Field of Classification Search .................. 707/960, 707/955, 957, 825, 802, 795, 791
See application file for complete search history.

(56) References Cited

U.S. PATENT DOCUMENTS

| 6,629,097 | B1 * | 9/2003 | Keith | 1/1 |
| 2004/0257375 | A1 * | 12/2004 | Cowperthwaite | 345/582 |
| 2006/0217925 | A1 * | 9/2006 | Taron et al. | 702/179 |

OTHER PUBLICATIONS

Nick Koudas, et al., "LDC: Enabling Search by Partial Distance In A Hyper-Dimensional Space", Proceedings of the $20^{th}$ International Conference on Data Engineering (ICDE), 2004, 12 Pages.
Giuseppe Calafiore, "Approximation of n-Dimensional Data Using Spherical and Ellipsoidal Primitives", IEEE Transactions on Systems, Man, and Cybernetics —Part A: Systems and Humans, vol. 32, No. 2, Mar. 2002, pp. 269-278.
"PlaySOM—Intuitive access to Music Archives", Vienna University of Technology, Institute of Software Technology and Interactive Systems, Information & Software Engineering Group, Music Information Retrieval, (http://www.ifs.tuwien.ac.at/mir/playsom.html), Feb. 8, 2006, 7 pages.
http://www.flickr.com (sample web page, see attached statement of Relevancy), Feb. 8, 2006.

* cited by examiner

*Primary Examiner* — Sana Al-Hashemi
(74) *Attorney, Agent, or Firm* — Oblon, Spivak, McClelland, Maier & Neustadt, L.L.P.

(57) ABSTRACT

A method of organizing data items in an n-dimensional space comprises, for each of a plurality of iterations, the step of generating a relative displacement of position for each data item within the n-dimensional space in accordance with a similarity value between each data item and respective other data items, the distance between each data item and respective other data items in the n-dimensional space, and the difference in position within the n-dimensional space between each data item and at least one reference point.

25 Claims, 6 Drawing Sheets

APPARATUS AND METHOD OF DATA ORGANISATION

FIELD OF THE INVENTION

The present invention relates to data organisation apparatus and methods of organising data.

The present invention also relates to a graphical user interface.

DESCRIPTION OF THE PRIOR ART

As domestic sources of digital media become more prevalent in the form of digital cameras, camcorders, and MP3 or ATRAC players and the like, a need to organise the resulting volumes of digital media generated by these sources becomes ever more acute.

Traditional solutions tend to require that users apply descriptive tags to their photos (for example Flickr—http://www.flickr.com/) or add artist or album details to their music files (although this can be done automatically by access to an online database).

Recent solutions to the organisation of large volumes of data derive distinctive feature vectors from the data itself, and then train learning systems such as artificial neural networks using these feature vectors. The artificial neural networks then organise the data according to the similarity of the feature vectors (for example in a self-organising map, such as http://www.ifs.tuwien.ac.at/mir/playsom.html). However, such systems are very slow and computationally expensive to train, are non-intuitive in their operation to the lay user, and need to be re-trained each time new data is added.

Consequently, there is scope to improve upon these solutions to the problem of organising large quantities of data. Embodiments of the present invention seek to alleviate or mitigate the above problem.

It is an object of the present invention to improve the organisation of large quantities of data.

SUMMARY OF THE INVENTION

An aspect of the present invention provides a method of organising data items in an n-dimensional space comprising, for each of a plurality of iterations, the step of: generating a relative displacement of position for each data item within the n-dimensional space in accordance with: a similarity between each data item and respective other data items, the distance between each data item and respective other data items in the n-dimensional space, and the difference in position within the n-dimensional space between each data item and at least one reference point.

By generating a relative displacement in an n-dimensional space dependent upon the similarity of each data item and respective other data items in the n-dimensional space, the data items can be organised within the n-dimensional space without recourse to computationally slow and expensive training schemes.

In one embodiment, the method further comprises determining the similarity between a data item and a respective other data item in accordance with the distance between feature vectors representative of each respective data item in a feature space. In one example, the data items are images and the feature vector comprises representations of the chrominance information of each image.

In this case, the distance in feature space between pairs of feature vectors representative of data items may be stored. This reduces the computational expense of the system as the similarity between pairs of data items can be calculated once and then stored.

As an example, one advantage of the present invention is provided because data items having a similar characteristic feature are arranged to be moved closer to each other and data items having a dissimilar characteristic feature are arranged to be moved further apart from one another. This type of organisation allows a user to more rapidly select a data item of interest from many data items. Further, by carrying out the relative displacement iteratively, the organisation of the data items on the screen may be watched by the user. Also, the data items can be organised into particular shapes which are selected by the user.

In one embodiment, the clustering is achieved by making any two of the data items repel one another. The magnitude of the repulsion, in one embodiment, being determined by the dissimilarity of the characteristic feature. For example, two data items having dissimilar image characteristics will repel each other by an amount greater than if the two data items have more similar image characteristics.

In order to balance out the repulsion, in this embodiment, each data item is set to be attracted to a common reference point. Typically, this is the origin of the space in which the visualisation of the organisation takes place. However, alternative or additional reference point(s) may be predetermined or, in order to increase the user flexibility, the alternative or additional reference point(s) may be determined by a user as he or she chooses. This allows the data items to be organised into different shapes. One example of such a shape is having the data items form the inside surface of a cylindrical shape.

By having each data item repel one another by an amount that is indicative of the dissimilarity between characteristics of the data items, the displacement caused to data items having dissimilar features is greater for a given iteration. Accordingly, for a given rate of iterations, the overall effect is for a user to see the data items having dissimilar features moving rapidly away from one another. This is useful if the invention is performed to output results to a graphical user interface.

According to one embodiment, therefore, a user of a suitably modified general purpose computer or entertainment device may watch the organisation of their photo collection into a body of locally similar photos. In this case, the viewpoint of the user may be manipulated in 3D space. Thus, the user may be able to bring desired photos to the fore where they can be easily selected for viewing or further processing.

There may be provided a graphical user interface arranged to display at least one part of a pool of data items such that, over time, mutually dissimilar items repel each other within the confines of a predetermined volume of 3D space, the items being bound/attracted to at least one reference point such that mutually similar items appear to cluster together.

Further aspects and various respective features of the present invention are provided in the appended claims. Features from the dependent claims may be combined with features of the independent claims as appropriate and not merely as explicitly set out in the claims.

BRIEF DESCRIPTION OF THE DRAWINGS

Embodiments of the present invention will now be described by way of example, with reference to the accompanying drawings, where like parts bear the same reference numerals, in which.

DESCRIPTION OF THE PREFERRED EMBODIMENTS

Figure 1:
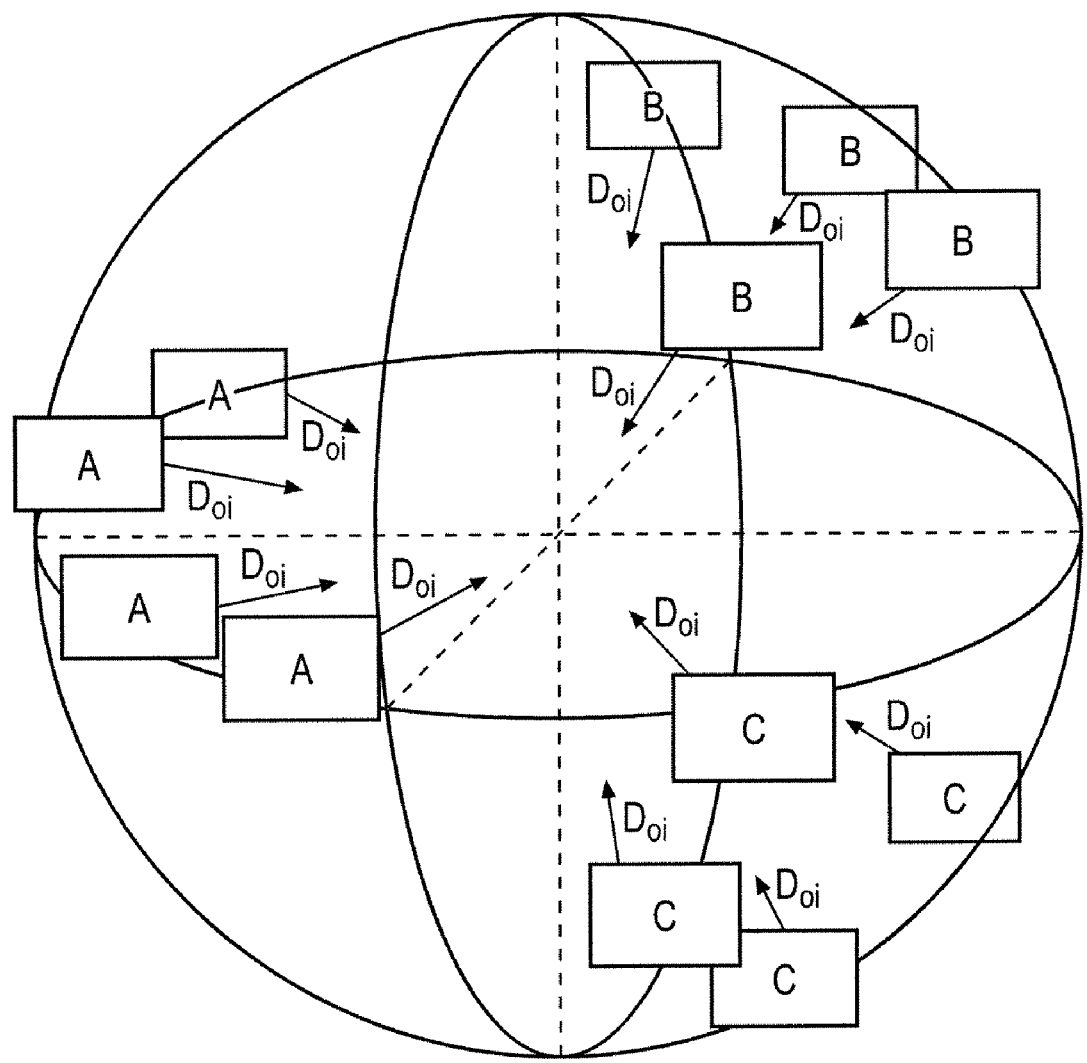
FIG. 1 is a schematic diagram of an organisation of data items in accordance with an embodiment of the present invention.

Referring now to FIG. 1, in an embodiment of the present invention, data items A, B and C expand out to populate a sphere centred on an origin O. These data items expand out in such a way that an emergent clustering or organisation of data items having a similar common characteristic feature occurs within the sphere. As will be explained later, this organisation is due to the balance of a strong repulsion of data items having a dissimilar common characteristic feature as well as a common attraction (represented by $D_{oi}$) of each data item toward the origin O. As will also be explained, the data items may expand out to populate other shapes, such as cylinders.

In this case, the common attraction may be towards a reference point that is different to the origin O. Also, there may be more than one reference point which would provide more flexibility to the user by allowing more clusters to be formed. Further, and alternatively, the data items may converge on the sphere based on a strong attraction between data items having a similar common characteristic feature and a repulsion of each data item from the origin.

Figure 2:
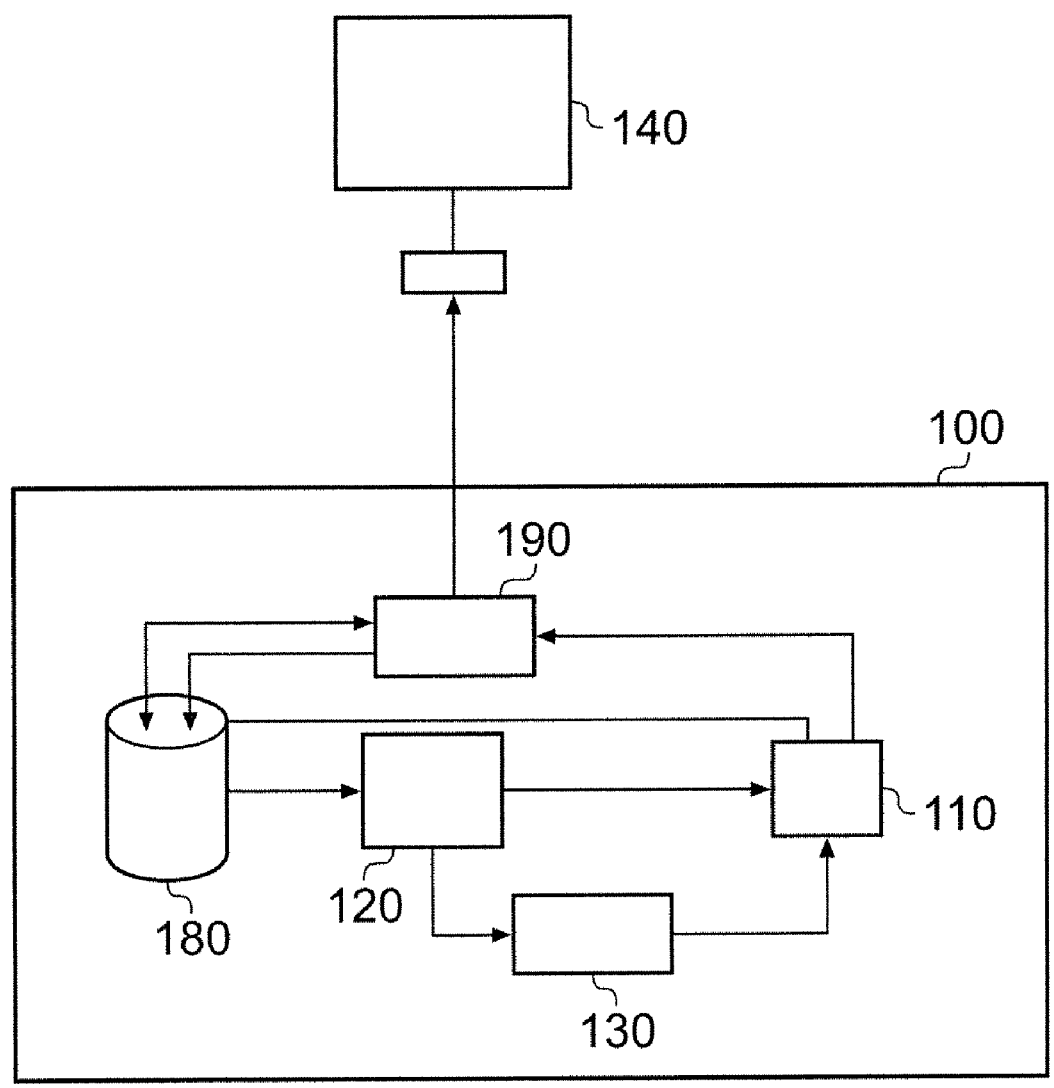
FIG. 2 is a schematic diagram of a general purpose computer and display using which embodiments of the present invention are performed.

Referring to FIG. 2, a general purpose computer 100 according to one embodiment includes a graphics card 190, a data processor 110 and a similarity processor 120. In this embodiment, a data item store 180 which stores the data items is provided with the general purpose computer 100. This may be a hard disk drive although the skilled person would appreciate that the data item store 180 may be a digital versatile disc (DVD), or the like, which is removable from the general purpose computer 100. Also, the skilled person will appreciate that the data item store 180 may be located remote from the general purpose computer 100 in a server, for example over the Internet. In this case, the general purpose computer 100 would also include a modem or the like (not shown).

Additionally provided in this embodiment of the general purpose computer 100 is a look up table 130 which is used to store details of feature vectors associated with the data items. The feature vectors are generated by the similarity processor 120 as will be explained hereinafter. The skilled person will appreciate that the look up table 130 may be any type of storage device or may be omitted altogether. Indeed, the look up table may be a randomly accessible storage device. If the look up table 130 is omitted, the similarity processor 120 will generate the feature vectors "on the fly". The feature vectors, in this case, would be passed directly to the data processor 110. Alternatively, the look up table 130 may be included but the similarity processor 120 may calculate feature vectors on the fly. Also, a combination of using stored feature vectors and feature vectors calculated on the fly is envisaged. For example, where the new additional data items are introduced, the feature vectors for these may be calculated on the fly and the stored feature vectors for legacy data items may be retrieved from the look up table 130.

The general purpose computer 100 is connected to a display 140.

In order to assist in the explanation of embodiments of the present invention, reference will be made to terms such as "force", "mass" and "acceleration". It will be understood that such references are made for ease of explanation. In other words, to assist the skilled person in understanding the present invention, the embodiments have been described in terms of a pseudo physical model.

Figure 3A:
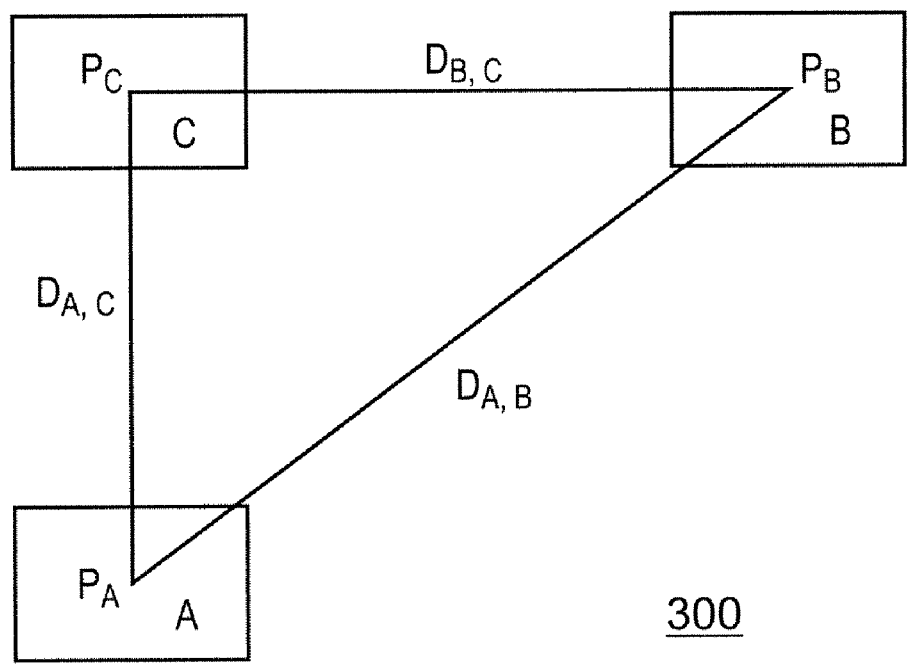
FIG. 3A is a schematic diagram of an n-dimensional space in which data items are organised in accordance with an embodiment of the present invention.
Figure 3B:
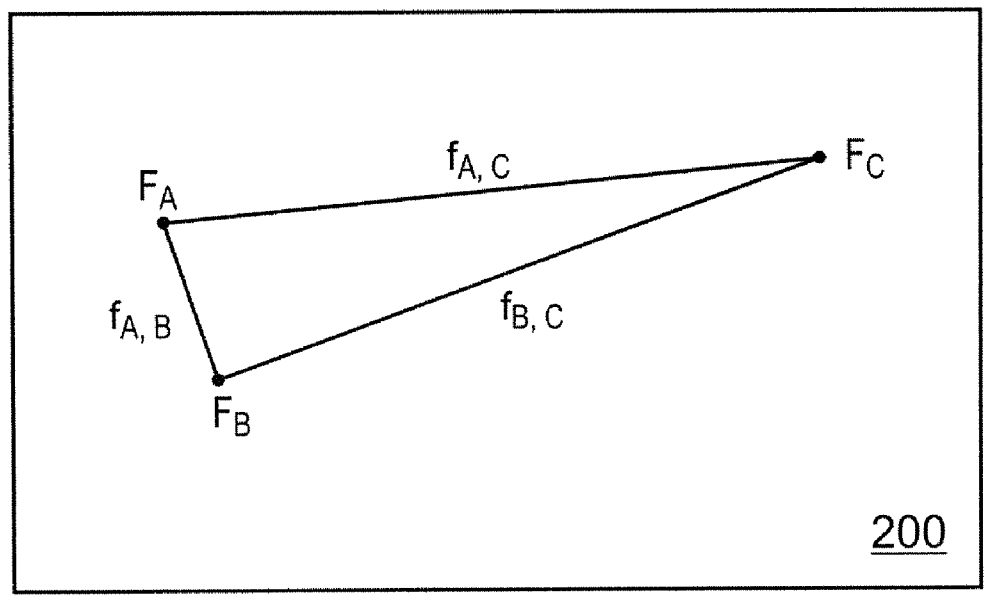
FIG. 3B is a schematic diagram of a feature space in which feature vector representations of data items are located in accordance with an embodiment of the present invention.

Referring now to FIGS. 3A and 3B, in an embodiment of the present invention, data items A, B and C have initial positions $P_A$, $P_B$ and $P_C$ in a 3D space 300. Meanwhile, feature vectors $\overline{F_A}$, $\overline{F_B}$ and $\overline{F_C}$ (which are representative of one or more features of data items A, B and C) have fixed positions within a feature space 200.

The features may for example be one or more selected from the list consisting of colour saturation or luminance for images, tempo for audio data, metadata associated with a data item, or some other abstraction of the data item. For example, the representative feature vectors may be obtained by one of a number of known techniques such as by principle component analysis (see for example http://www.statsoft.com/textbook/stfacan.html) implemented by the similarity processor 120 when implementing suitable instructions.

Notably, the relationships between the initial positions of the data items in 3D space 300 and their corresponding feature vectors in feature space 200 may be significantly different. In the illustrated example for instance, the representative features of data items A and B are more similar to each other than to those of data item C, as can be seen within the feature space 200. However, in 3D space, data items A and B are further separated from one another than they are from data item C. Thus the initial positions of the data items in 3D space 300 may not be representative of the relatedness of the data items.

In an embodiment of the present invention, to update the position of each data item in 3D space 300 to better reflect their similarity, each data item is given a notional mass (for example a unit mass) and a total corrective 'force' is applied to the each data item, causing it to move iteratively over a series of positional updates.

In one example, the so-called force applied to data item A due to data item B is calculated. Firstly, the difference vector $\underline{D}_{AB} = \underline{P}_A - \underline{P}_B$ between the data items' position in 3D space is obtained. The direction of this vector (when given a magnitude of 1) is:

$$\frac{\underline{P}_A - \underline{P}_B}{|\underline{P}_A - \underline{P}_B|} = \frac{\underline{D}_{AB}}{|\underline{D}_{AB}|}$$

Then, the magnitude of the difference between the feature vectors of data item A and B in feature space 200 is obtained which is given by:

$$\frac{|F_A - F_B|}{|D_{AB}|^2}$$

The resultant force vector is the product of the direction of the difference in position in 3D space 300 between data item A and data item B and the magnitude of the difference in feature vector space 200 between data item A and data item B. In other words, the resultant force applied to data item A by the presence of data item B is:

$$F_{AB} = \frac{D_{AB}}{|D_{AB}|} \times \frac{|F_A - F_B|}{|D_{AB}|^2} = \frac{|F_A - F_B|}{|D_{AB}|^3} \times D_{AB}$$

For brevity, $|F_A - F_B|$ will be referred to as $f_{AB}$ hereinafter and $|D_{AB}|^3$ will be referred to as $d_{AB}^3$ hereinafter.

The force vectors on each of A, B and C due to the other data items are then calculated by data processor 110 as:

$$F_A = \frac{D_{AB} \times f_{AB}}{d_{AB}^3} + \frac{D_{AC} \times f_{AC}}{d_{AC}^3}$$

$$F_B = \frac{D_{BA} \times f_{BA}}{d_{BA}^3} + \frac{D_{BC} \times f_{BC}}{d_{BC}^3}$$

$$F_C = \frac{D_{CB} \times f_{CB}}{d_{CB}^3} + \frac{D_{CA} \times f_{CA}}{d_{CA}^3}$$

More generally, for N data items 1 ... i ... N, the resultant force on a given data item i is:

$$F_i = \sum_{j=1}^{N} \frac{D_{ij} \times f_{ij}}{d_{ij}^3} \bigg|_{j \neq i}$$

Each force in the summation acts in the direction from j to i. Consequently the resultant force is repulsive, acting to push data item i away from other data items.

Notably, the repulsive force for each data item pair is proportional to their distance apart $f_{ij}$ in feature space 200, and inversely proportional to the cube of their distance apart $d_{ij}$ in 3D space 300. Therefore the repulsive force between two dissimilar data items close together in 3D space 300 will be much greater than the repulsive force between two similar items some distance apart in 3D space 300. The net effect therefore is that the data items expand apart at rates related to their levels of mutual dissimilarity.

To prevent the expansion being indefinite a further, attractive, force $D_{oi}$, pulling data item i toward a common reference point, is applied. This force is proportional to the distance of a data point from the reference point. Typically the common reference point is the origin of the 3D space 300, but is not limited to this. Further, the reference point may be determined by the user, or may be a predetermined reference point. The total force $F'_i$ applied to data item i is therefore:

$$F'_i = D_{oi} + \sum_{j=1}^{N} \frac{D_{ij} \times f_{ij}}{d_{ij}^3} \bigg|_{j \neq i}.$$

Consequently, there will be a radial distance from the origin at which the further attractive force acting radially toward the origin balances the outward radial component of the net resultant force from the other data points in the 3D space 300, thereby halting any further radial expansion.

In an alternative embodiment of the present invention, each force in the summation force acts in the direction from i to j. Consequently the resultant force is attractive, acting to pull data item i toward other data items. In this case, however, the force is inversely proportional to the distance $f_{ij}$ in feature space 200:

$$F_i = \sum_{j=1}^{N} \frac{D_{ji}}{d_{ij}^3 \times f_{ij}} \bigg|_{j \neq i}$$

It will be appreciated that in such circumstances, the denominator may use a lower power law relationship for $d_{ij}$, giving for example $d_{ij}^2 \times f_{ij}$.

Therefore the attractive force between two similar data items some distance apart in 3D space 300 will be much greater than the attractive force between two dissimilar items close together in 3D space 300. The net effect therefore is that the data items converge together at rates related to their levels of mutual similarity.

In this alternative embodiment, to prevent the convergence being indefinite (i.e. to a single point) a further, repulsive, force $D_{io}$ is applied to each data item. This force acts to push each data item away from a common reference point, and is inversely proportional to the distance of a data point from the common reference point. The common reference point is typically the origin of the 3D space 300, but is not so limited. Further, the reference point may be determined by the user or may be a predetermined reference point. The total force $F'_i$ applied to data item i is therefore:

$$F'_i = D_{io} + \sum_{j=1}^{N} \frac{D_{ji}}{d_{ij}^2 \times f_{ij}} \bigg|_{j \neq i}.$$

Note that $d_{ij} = d_{ji}$ and $f_{ij} = f_{ji}$.

Consequently, there will be a radial distance from the origin at which the further repulsive force acting radially away from the origin balances the inward radial component of the net resultant force from the other data points in the 3D space 300, thereby halting further radial convergence.

In either the expansion through dissimilarity embodiment or the convergence through similarity embodiment, it will be appreciated by a person skilled in the art that the force between two data items may depend upon variants of $f_{ij}$ and $d_{ij}^3$. For example, alternative power-law relationships such as $d_{ij}^2$ and $f_{ij}^2$ may be used, or other functions dependent upon $f_{ij}$ and $d_{ij}$.

It will likewise also be appreciated by a person skilled in the art that an approximate form of $F'_i$ may be obtained based only on those M<N data items separated from data item i in 3D space 300 by less than a threshold distance. In this case, the threshold distance is such that the forces from data items lying outside the threshold distance become comparatively small.

Likewise, it will be appreciated that the 3D space 300 may equally be a 2D space or potentially any n-dimensional space.

It will further be appreciated that more than one reference point may be used, resulting in more than one further force. This can produce the effect of having discrete clusters of data items centred around each reference point. In this case, each of the data items may not have the further force calculated with respect to different reference points. Reference planes, surfaces or objects may also be used, and be understood to comprise a plurality of reference points. Optionally, however, in such a circumstance only the reference point closest to a particular data item would be used to limit computational load. The effect of such reference points, planes, surfaces and objects is to enable the generation of alternative shapes to the spherical clusters described above. In such circumstances, both attractive and repulsive forces based on respective reference points may be used at the same time.

Figure 4:
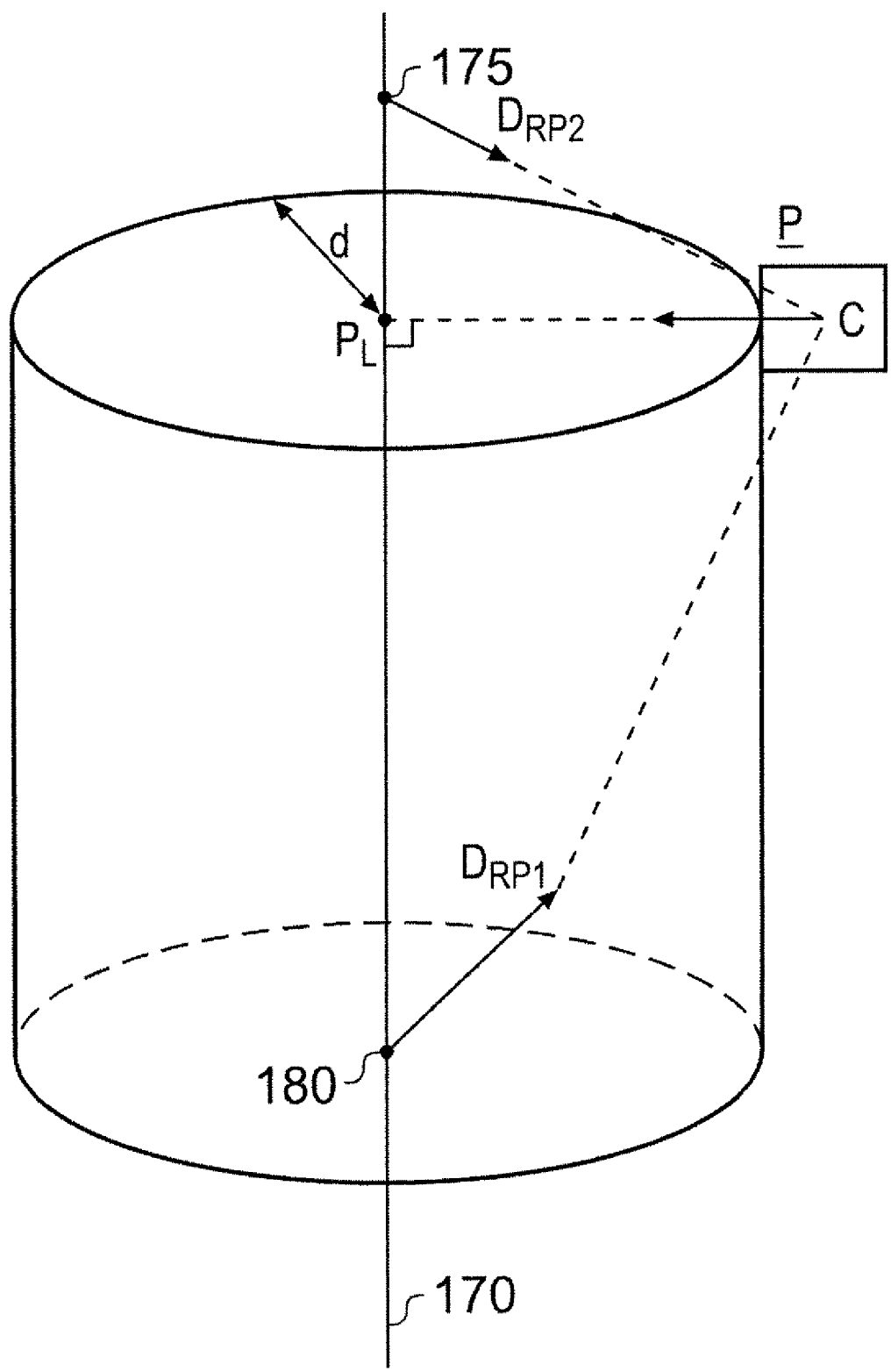
FIG. 4 is a diagram of an n-dimensional space in which data items are organised in a cylindrical shape.

In one embodiment, the data items are arranged to cluster in a cylindrical shape. This is explained with reference to FIG. 4. In order to achieve this, a bounding force, P, is applied to the data item. The bounding force needs to be applied perpendicularly to a line 170 extending along the length of the cylinder. In other words, towards point $P_L$ on the line. The line 170 is in replacement of the reference point used in the sphere clustering embodiment. In other words, each data item has a force applied which attracts the data item to the line 170. The skilled person will appreciate that line 170 has an equation of the form $$\underline{L} = \underline{L}_1 + (\underline{L}_2 - \underline{L}_1) \times t$$

In order to find the direction of P, the value of t is calculated such that the radius of the cylinder, d, is minimised. Thus, $$\frac{-(\underline{L}_1 - \underline{P}) \times (\underline{L}_2 - \underline{L}_1)}{|\underline{L}_2 - \underline{L}_1|^2} = t$$

Consequently, the direction of the force is $P_L - P$.

As above, the magnitude of the force is dependent upon the distance of data item C from the line 170.

In order to stop the data items spreading infinitely along line 170, two reference points, 175 and 180, are placed along the line 170. These provide an upper and lower boundary for the length of the cylindrical shape. In order to contain the data items within the cylindrical shape, each reference point will provide a repulsive force which acts on each data item, and in this case, data item C, in direction $D_{RP1}$ and $D_{RP2}$ as shown. The direction $D_{RP1}$ and $D_{RP2}$ is away from reference points 180 and 175, respectively.

The magnitude of the forces provided by the line 170 and reference points 175 and 180 are calculated in a similar manner to those discussed in respect of the sphere and so will not be repeated here.

In an adaptation of the cylindrical example, the data items may be arranged as a toroid. In order to achieve this, the line 170 used in the cylindrical example will be in the form of a circle. Other shapes are envisaged in which the line 170 is replaced with a differently shaped locus.

It will also be appreciated that the feature vectors representative of data items will occupy fixed positions within the feature space 200 (subject to any modification of the data items) and therefore for the purposes of the above process the values of $f_{ij}$ can be pre-computed and stored in a look-up table prior to updating the relative positions of the data items in 3D space 300. This will increase the speed at which the data is organised and reduce the computational expense because the values of $f_{ij}$ do not need to be re-calculated each time the data is to be organised. Moreover, this is particularly advantageous when the data items do not often change, for example with stored photographs.

Continuing the convention of describing the embodiments in terms of the pseudo physical model, the data items are moved according to Newton's second law $\underline{F'}_i = ma$ where m is an arbitrary mass (e.g. unity) and a is an acceleration in a particular direction. Thus in an embodiment of the present invention, each data item has a similar mass and an initial velocity of zero. By applying $\underline{F'}_i$, the velocities change over a time interval $\Delta t$ as $\Delta \underline{v}_i = (\underline{F'}_i \, \underline{\Delta t})/m$, thereby causing the data items to be redistributed in 3D space.

Optionally, updating the velocity $v_i$ of a data item i may further incorporate a friction term to limit the overall velocity of an object, as in $\underline{v}_{i,t+\Delta t} = \underline{v}_{i,t}(1-\text{friction}) + \Delta \underline{v}_i$.

It will be appreciated by a person skilled in the art that, for a notional unit mass, $\underline{F'}_i = a$ and thus $\underline{F'}_i$ can be interpreted directly in terms of determining a relative displacement of data item i for a given time step or iteration, rather than in terms of a force. Consequently, for example, the friction term can be interpreted simply as a relative displacement scaling factor.

The iteration or update interval $\Delta t$ is typically the refresh/frame rate of the display device 150. Consequently, the redistribution of data items as they are organised can be observed by a user in real time.

The data items to be organised may be one type selected from the list consisting of textual data, still image data, video image data and audio data. In the situation where it is desired to visualize the data, such as for example when organising a photo collection, the attractive or repulsive force from the reference point may be adjusted to provide a sufficiently large radial point of balance that thumbnail representations of the data items are sufficiently spaced out to be viewable. This adjustment may be done by a user or alternatively or in addition may be made a function of the number of data items being organised.

Where the data items to be organised are video or still image items, a composite image based upon thumbnail versions of the source images can be generated, showing the current organisation of the images in n-dimensional (typically 3D) space. In the case of video, a representative key stamp of the video could be used as a thumbnail for the video clip.

In an embodiment of the present invention, the data items are the result of a search process.

In an embodiment of the present invention, a user controls a viewpoint within the 3-dimensional space, for example via controller 140. Various changes to view point are envisaged. For example, the viewpoint may roam freely through the 3D space 300, or may be locked to face a reference point whilst being movable within the 3D space 300. Alternatively or in addition, the viewpoint may rotate about its axis, or may apply a zoom.

Figure 5A:
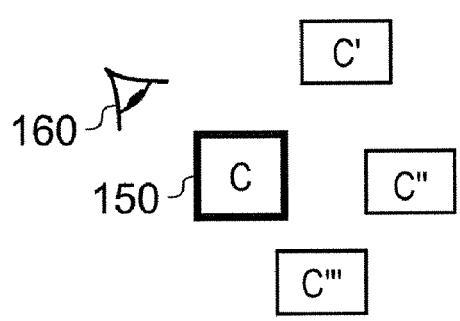
FIGS. 5A and 5B is a diagram of a data item highlighting facility provided in one embodiment of the present invention.
Figure 5B:
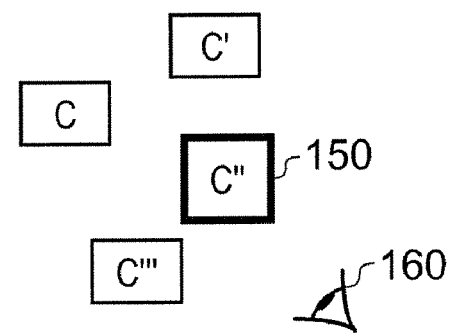

In an embodiment shown in FIG. 5A, a cluster of data items C, C', C'', C''' is shown. Around the edge of data item C, which is closest to the current viewpoint of user 160, a box 150 is drawn. This highlights the data item C. The user may then select this data item C. In FIG. 5B, the viewpoint of the user 160 has moved relative to the data items C, C', C'', C'''. Data item C'' is now closest to the viewpoint of the user 160. Around the edge of data item C'', a white box is drawn. The user may now select data item C''. Although FIGS. 5A and 5B have been described with reference to a white box, other forms of highlighting is envisaged such as a flashing data item, appropriate shading on or around the data item etc.

Further, the user may control the size of the sphere around which the data items are clustered.

Notably, if each iteration of the change in relative displacement is shown on display unit 150, the organisation of a data collection may then be represented by moving displayed data items in a 3D environment. The organisation will be carried out in accordance with the previously described dynamic calculation of the relatedness of the data items in the data collection, the data items' relative position to each other in a 3D space 300, and the relative positions of the data items to at least a first common reference point in the 3D space 300, so as to provide a user with a visualisation of their redistribution over time.

Figure 6:
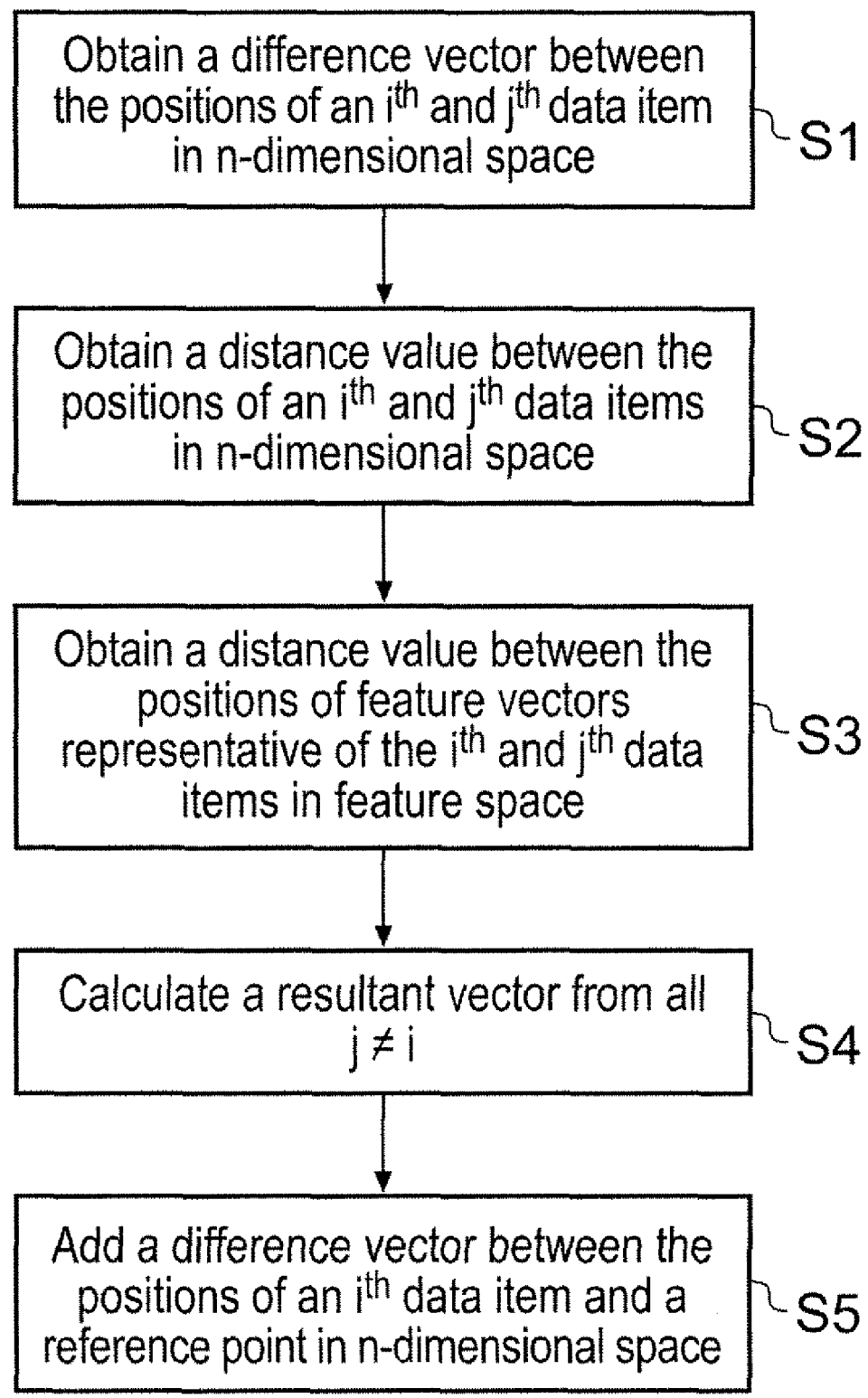
FIG. 6 is a flow diagram of a method of organisation in accordance with an embodiment of the present invention.

Referring now to FIG. 6. In an embodiment of the present invention, a method of organising data items corresponds to the operation of the above described apparatus and requires the generation of a relative displacement of position for an $i^{th}$ data item within an n-dimensional (typically 3D) space. This relative displacement is generated by a number of steps. The first step s1 comprises obtaining a difference vector based on the difference in position between the $i^{th}$ data item and a $j^{th}$ data item. The second step s2 obtains a distance measure between said $i^{th}$ and $j^{th}$ data item in n-dimensional space. The third step s3 obtains a distance measure between feature vectors of said $i^{th}$ and $j^{th}$ data items in feature space 200. These three measures are combined in step s4 for all $j \neq i$ to produce a resultant value based on the difference vector and distance measures. Finally, step 5 requires the addition of a further difference vector obtained from the difference in position between the $i^{th}$ data item and a reference point in the n-dimensional space. It will be noted that the number of dimensions may be dependent on the number of characteristics represented in the feature vector.

It will be apparent to a person skilled in the art that variations in the above method corresponding to operation of the variations in apparatus disclosed above are also considered within the scope of the present invention, including:

The use of repulsive forces between data items together with an attractive force between each data item and at least a first reference point; or alternatively The use of attractive forces between data items together with a repulsive force between each data item and at least a first reference point;

Adjusting the force between each data item and at least a first reference point according to the number of data items;

Applying a relative displacement scaling factor; and

Accessing similarity values via a look-up table;

It will be appreciated that embodiments of the present invention may be implemented by a suitably modified general purpose computer or entertainment device in any suitable manner. For example, the entertainment device may calculate the relative displacement values using the data processor 110 to execute suitable instructions.

Thus adapting existing parts of a conventional entertainment device may comprise for example reprogramming of one or more processors therein. As such the required adaptation may be implemented in the form of a computer program product comprising processor-implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these or other networks.

An appropriate general purpose computer or entertainment device upon which embodiments of this invention are realised may be a Sony® Playstation 3® games system, although any other computer with a processor and display, such as a Sony® Playstation 2® games system, or a Sony® Viao® computer would also be envisaged.

Further, the invention may be realised on a Portable Digital Assistant, Mobile Telephone, Playstation Portable® (PSP®) or any other portable device. Additionally, the skilled person will appreciate that the portable device may operate in conjunction with another general purpose computer in such a way that the general purpose computer calculates the displacement of the data items and the portable device displays the iterative clustering of the data items.

I claim:

1. A method of organizing data items in an n-dimensional space comprising, for each of a plurality of iterations, the step of:

generating, using a processor, a relative displacement of position for each data item within the n-dimensional space for display on a display screen in accordance with:
  i. a similarity value between each data item and respective other data items,
  ii. a distance between a position of each data item and respective other data items in the n-dimensional space, and
  iii. a difference in position within the n-dimensional space between each data item and at least one reference point; and updating the position of each data item within the n-dimensional space on the display screen using the relative displacement for each data item generated by the generating step.

2. A data organization apparatus for organizing data items in an n-dimensional space, comprising:

a generating unit, including a processor, configured to iteratively generate a relative displacement of position for each data item within the n-dimensional space for display on a display screen in accordance with:
  i. a similarity between each data item and respective other data items,
  ii. a distance between each data item and respective other data items in the n-dimensional space, and
  iii. a difference in position within the n-dimensional space between each data item and at least one reference point; and an updating unit configured to update the position of each data item within the n-dimensional space on the display screen using the relative displacement for each data item generated by the generating unit.

3. A data organization apparatus for organizing data items in an n-dimensional space, comprising:

means for iteratively generating a relative displacement of position for each data item within the n-dimensional space for display on a display in accordance with:
  i. a similarity between each data item and respective other data items,
  ii. a distance between each data item and respective other data items in the n-dimensional space, and
  iii. a difference in position within the n-dimensional space between each data item and at least one reference point; and means for updating the position of each data item within the n-dimensional space on the display using the relative displacement for each data item generated by the means for iteratively generating.

4. The method according to claim 1, comprising:

determining the similarity between a data item and a respective other data item in accordance with the distance between feature vectors representative of each respective data item in a feature space.

5. The method according to claim 1, wherein (ii) the distance between a position of each data item and respective other data items is used to form a sum of differences in position between the data item and respective other data items, and (iii) the difference in position within the n-dimensional space between each data item and the reference point is used to adjust each difference to be summed by a value dependent upon the distance between the data item and a respective other data item in the n-dimensional space, and the relative displacement of position of each data item is determined by a vector, providing direction in the n-dimensional space and an amount of displacement, the vector being determined by combining the (i) similarity value between each data item and the respective other data items with the adjusted differences to be summed.

6. The method according to claim 1, in which the reference point of the n-dimensional space is the origin of the n-dimensional space.

7. The method according to claim 1, comprising:
scaling the difference in position within the n-dimensional space between each data item and at least one reference point in dependence upon the total number of data items.

8. The method according to claim 1, in which the iteration rate corresponds to the frame rate of a display device.

9. The method according to claim 1, wherein the n-dimensional space is a three-dimensional space.

10. The method according to claim 1, wherein the data items are images and the feature vector is determined in accordance with chrominance information of the images.

11. The method according to claim 1, wherein the data items are source images.

12. A non-transitory computer readable medium comprising computer readable instructions that, when executed by a computer, cause the computer to carry out the method of claim 1.

13. The data organization apparatus according to claim 2, wherein the generating unit is configured to determine the similarity between a data item and a respective other data item in accordance with the distance between feature vectors representative of each respective data item in a feature space.

14. The data organization apparatus according to claim 2 in which the generating unit is configured such that (ii) the distance between a position of each data item and respective other data items is used to form a sum of differences in position between the data item and respective other data items, and (iii) the difference in position within the n-dimensional space between each data item and the reference point is used to adjust each difference to be summed by a value dependent upon the distance between the data item and a respective other data item in the n-dimensional space, and the relative displacement of position of each data item is determined by a vector, providing direction in the n-dimensional space and an amount of displacement, the vector being determined by combining the (i) similarity value between each data item and the respective other data items with the adjusted differences to be summed.

15. The data organization apparatus according to claim 2 wherein the apparatus is configured such that the reference point of the n-dimensional space is the origin of the n dimensional space.

16. The data organization apparatus according to claim 2 wherein the generating unit is configured to scale the difference in position within the n-dimensional space between each data item and at least one reference point in dependence upon the total number of data items.

17. The data organization apparatus according to claim 2, wherein the apparatus is configured such that iteration rate corresponds to the frame of a display device.

18. The data organization apparatus according to claim 2, wherein n-dimensional space is a three dimensional space.

19. The data organization apparatus according to claim 2, wherein the data items are images and the feature vector is determined in accordance with chrominance information of the images.

20. The apparatus according to claim 2, wherein the data items are source images.

21. A non-transitory computer readable medium comprising computer readable instructions that, when executed by a computer, cause the computer to operate as a data organization apparatus according to claim 2.

22. The method according to claim 4, comprising: storing the distance in feature space between pairs of feature vectors representative of data items.

23. The method according to claim 5, in which said adjustment is made by dividing each difference to be summed by a value dependent upon the distance between the data item and a respective other data item in the n-dimensional space.

24. The data organization apparatus according to claim 13, comprising a storage unit configured to store the distance in feature space between pairs of feature vectors representative of data items.

25. The data organization apparatus according to claim 14 wherein the generating unit is configured such that said adjustment is made by dividing each difference to be summed by a value dependent upon the distance between the data item and a respective other data item in the n-dimensional space.

* * * * *